(12) United States Patent
Oyama et al.

(10) Patent No.: US 6,871,826 B2
(45) Date of Patent: Mar. 29, 2005

(54) EQUIPMENT ADJUSTING LEG

(75) Inventors: Junji Oyama, Sagamihara (JP); Yuki Kamada, Sagamihara (JP)

(73) Assignee: Nix, Inc., Kanagawa (JP)

( * ) Notice: Subject to any disclaimer, the term of this patent is extended or adjusted under 35 U.S.C. 154(b) by 341 days.

(21) Appl. No.: 10/106,331

(22) Filed: Mar. 27, 2002

(65) Prior Publication Data
US 2002/0139909 A1 Oct. 3, 2002

(30) Foreign Application Priority Data

Mar. 29, 2001 (JP) ........................................ 2001-094978

(51) Int. Cl.$^7$ ............................................. F16M 11/24
(52) U.S. Cl. .................. 248/188.8; 248/188.4
(58) Field of Search ............................. 248/188.8, 677, 248/188.2, 188.4, 188.5, 188.1, 649, 650, 655, 656, 669, 188.9, 615, 616; 411/383, 384, 389, 395, 424, 900–904

(56) References Cited

U.S. PATENT DOCUMENTS

| | | | | |
|---|---|---|---|---|
| 324,768 | A | * | 8/1885 | Hunt .......................... 411/358 |
| 4,108,407 | A | * | 8/1978 | Cable et al. ................ 248/656 |
| 4,525,114 | A | * | 6/1985 | Hirst .......................... 411/395 |
| 4,789,121 | A | * | 12/1988 | Gidseg et al. ............ 248/188.2 |
| 4,793,751 | A | * | 12/1988 | Takeuchi et al. .............. 411/13 |
| 5,169,400 | A | * | 12/1992 | Muhling et al. ............ 411/395 |
| 5,292,095 | A | * | 3/1994 | Cattaneo ................... 248/188.4 |
| 5,332,182 | A | * | 7/1994 | Weisz et al. ............. 248/188.4 |
| 5,836,556 | A | * | 11/1998 | Kim .......................... 248/188.4 |
| 6,024,330 | A | * | 2/2000 | Mroz et al. ............... 248/188.4 |
| 6,302,543 | B1 | * | 10/2001 | Arai et al. ................... 248/157 |
| 6,359,907 | B1 | * | 3/2002 | Wolters et al. .............. 370/485 |
| 6,430,756 | B1 | * | 8/2002 | Reilly ......................... 411/395 |
| 6,461,002 | B1 | * | 10/2002 | Su ........................... 248/188.4 |

FOREIGN PATENT DOCUMENTS

| | | | |
|---|---|---|---|
| JP | 55-28230 | | 8/1978 |
| JP | 2-066397 | | 3/1990 |
| JP | 02077295 | A * | 3/1990 |
| JP | 411082881 | A * | 3/1999 |
| JP | 2002130586 | A * | 5/2002 |

* cited by examiner

Primary Examiner—Anita King
(74) Attorney, Agent, or Firm—Nixon Peabody, LLP

(57) ABSTRACT

An equipment adjusting leg is provided which is lightweight and which can achieve cost reduction without decreasing impact-resistant strength. The impact-resistant strength is secured and the light weight is achieved by the structure of the equipment adjusting leg, which comprises: a leg 10 which is provided in the lower part of an external frame of the equipment in a manner capable of moving up and down, and of which lower part is formed as a ground contact part 16 and of which upper part is formed as a sliding shaft 17 with a concavo-convex part 18 like, for example, a screw, provided around the periphery of the sliding shaft 17; an element for locking the up-and-down movements of the leg; and an element for releasing the lock; wherein the sliding shaft 17 of the leg 10 is constructed by using a resin with excellent mechanical strength, such as polycarbonate, to construct a peripheral part, and by using an elongated metallic member (a metal shaft 24) as a core.

9 Claims, 10 Drawing Sheets

PRIOR ART

PRIOR ART

EQUIPMENT ADJUSTING LEG

BACKGROUND OF THE INVENTION

1. Field of the Invention

The present invention relates to equipment adjusting legs which are used to adjust the gradient and height of the equipment when electronic and electrical equipment or appliances such as washing machines and projectors are set on the floor or desk.

2. Description of the Related Art

As a conventional method often used for adjusting the height of equipment such as washing machines, there is a method of loosening a nut, turning a bolt to adjust the height, and then tightening the nut. However, this method has a drawback that the height adjusting operations are cumbersome.

Accordingly, as an adjusting leg capable of easily adjusting the height, there is an invention described in Japanese Patent Laid-Open (Kokai) Publication No. HEI 2-74298. As shown in FIG. 8, FIG. 9 (in the state of being released), and FIG. 10, the adjusting leg described in such publication comprises: a leg bearing 82 provided in the lower part of equipment 81; a leg 84 provided at the leg bearing in a manner freely movable up and down and always biased downward by a leg spring 83; and an adjusting knob 85 mounted in a freely rotatable manner on the leg bearing 82. Around the circumference of the leg bearing 82 are formed a plurality of slits 86 extending in a vertical direction and partitions 87 which can move outwardly. Around the periphery of the partitions 87 of the leg bearing 82 are formed a plurality of first ribs 88 extending in a vertical direction. The inside surface of the adjusting knob 85 is formed in a polygonal shape, and over the inside surface of the adjusting knob 85 are formed a plurality of second ribs 89 extending in a vertical direction. The outside surface of the partitions 87 of the leg bearing 82 is surrounded by the inside surface of the adjusting knob 85, so that turning the adjusting knob 85 moves the partitions 87, thereby expanding or contracting the inside diameter of the leg bearing 82. The adjusting knob 85 is structured in such a manner that contacts between the first ribs and the second ribs regulate the turning angle of the adjusting knob 85. When the turning angle of the adjusting knob 85 is regulated, the inside diameter 90 of the leg bearing 82 becomes smaller (the inside surface 91 of the adjusting knob 85 forces the partitions 87 of the leg bearing 82 to elastically deform) and the up-and-down movements of the leg 84 are inhibited.

However, with this conventional adjusting leg, the leg shaft is composed of a metal bolt in order to resist any impact (mainly impact in a direction perpendicular to the lengthwise direction of the leg, that is, impact in a horizontal direction) which occurs, for example, when the leg falls off. The head of the bolt is coated with resin by means of, for example, insert molding in order to enhance ground contact stability. It is also necessary to perform secondary processing (such as groove formation) on the bolt for attaching a stopper, and to perform coating according to the color of the equipment in order to enhance the appearance of the adjusting leg. Accordingly, the drawback of such adjusting leg is that it is cumbersome to manufacture the leg using the metal bolt, thereby increasing costs. Another drawback is that the leg which uses the metal bolt is heavy.

SUMMARY OF THE INVENTION

The present invention is designed to solve the above-described problems. It is an object of this invention to reduce the costs without decreasing the impact-resistant strength and to provide a lightweight equipment adjusting leg.

This invention adopts the following structure in order to achieve the above-described object.

An equipment adjusting leg according to this invention comprises: a leg provided in a manner capable of moving back and forth relative to an external frame of a piece of equipment; a locking element for locking the back-and-forth movement of the leg; and a lock release element for releasing the lock; wherein the leg has a sliding shaft for enabling the movement, and the sliding shaft comprises a core made of a metallic member, and a peripheral part which is formed around the periphery of the core and which is made of resin having mechanical strength.

The leg is provided in the lower part of the external frame of the equipment in a manner capable of moving up and down, and the lower part of the leg is formed as a ground contact part and the upper part of the leg is formed as the sliding shaft.

The sliding shaft can have a concavo-convex part. This concavo-convex part may be composed of a screw. The core may take an elongated shape.

The resin having mechanical strength can be made of engineering plastic. The engineering plastic can be selected from a group consisting of polycarbonate, polyamide, polyacetal, PBT, and combinations of these respective materials and glass fibers.

The locking element can be structured in such a manner that it comprises: an attaching case for inserting the sliding shaft therethrough; a locking piece pivoted on the attaching case in a rotatable manner and being capable of engaging with the sliding shaft; and an engagement maintaining element for maintaining the engagement of the locking piece with the sliding shaft; wherein the rotation shaft center of the locking piece is displaced from the shaft center of the sliding shaft.

Moreover, the locking element can be structured in such a manner that it comprises: an attaching case for inserting the sliding shaft therethrough; a locking piece pivoted on the attaching case in a rotatable manner and comprising a concavo-convex part to engage with the concavo-convex part of the sliding shaft; and an engagement maintaining element for maintaining the engagement of the concavo-convex part of the sliding shaft with the concavo-convex part of the locking piece; wherein the rotation shaft center of the locking piece is displaced from the shaft center of the sliding shaft.

DETAILED DESCRIPTION OF THE PREFERRED EMBODIMENTS

EXAMPLE 1

An embodiment of the equipment adjusting leg according to this invention (hereinafter referred to as "Example 1") is hereinafter described with reference to the attached drawings.

Figure 1:
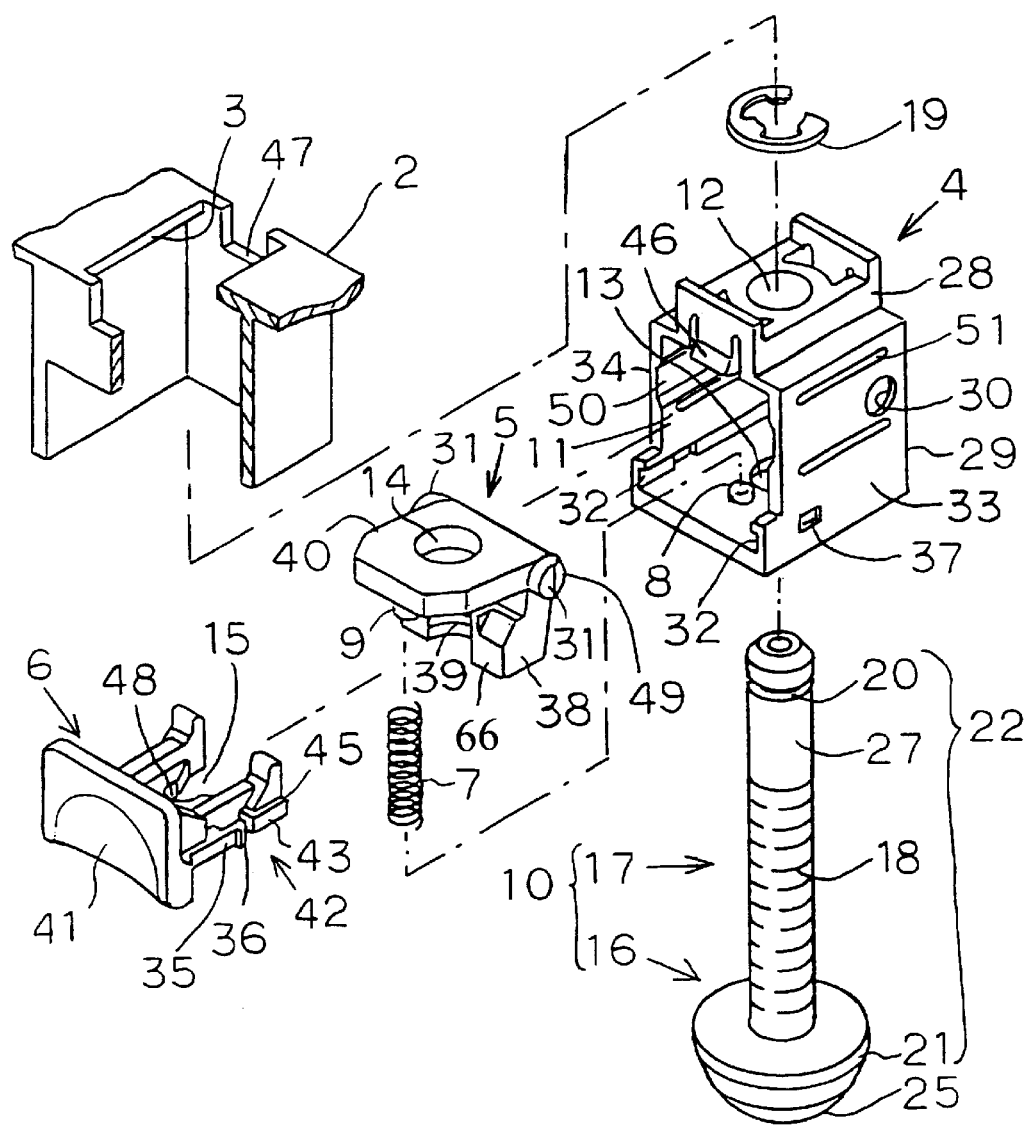
FIG. 1 is an exploded perspective view of an equipment adjusting leg according to Example 1 of the present invention.
Figure 2:
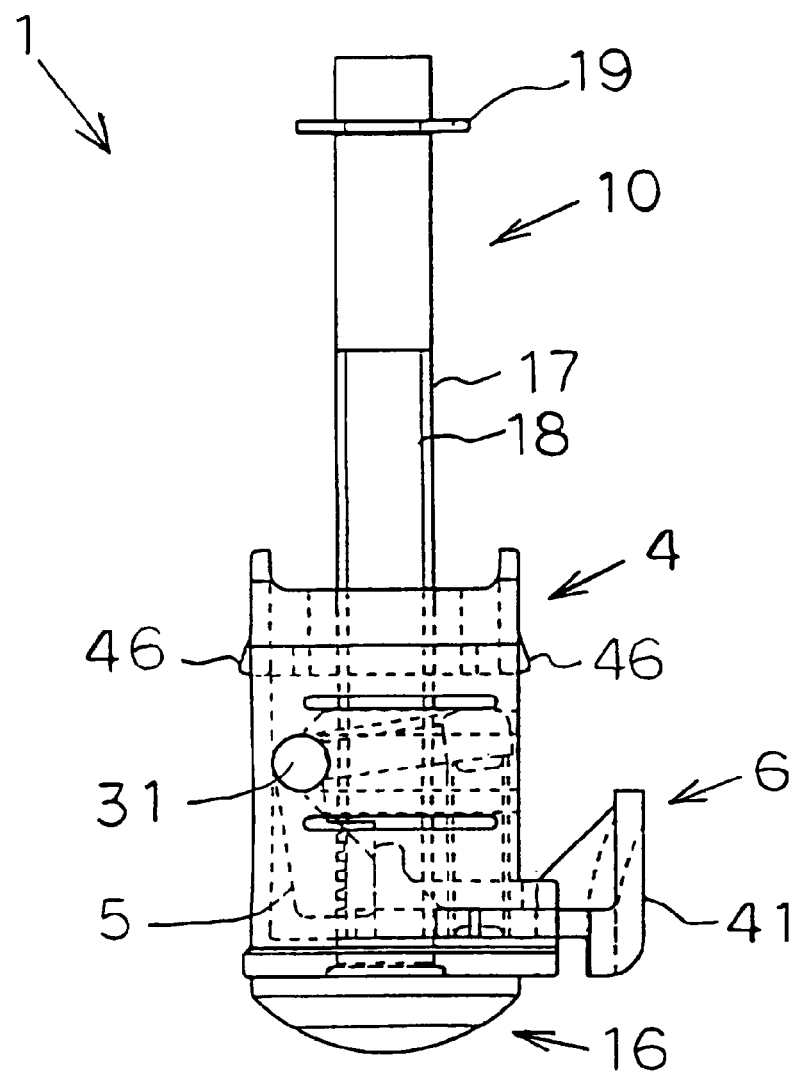
FIG. 2 is a front view of the equipment adjusting leg according to Example 1 of this invention in an assembled state.
Figure 3:
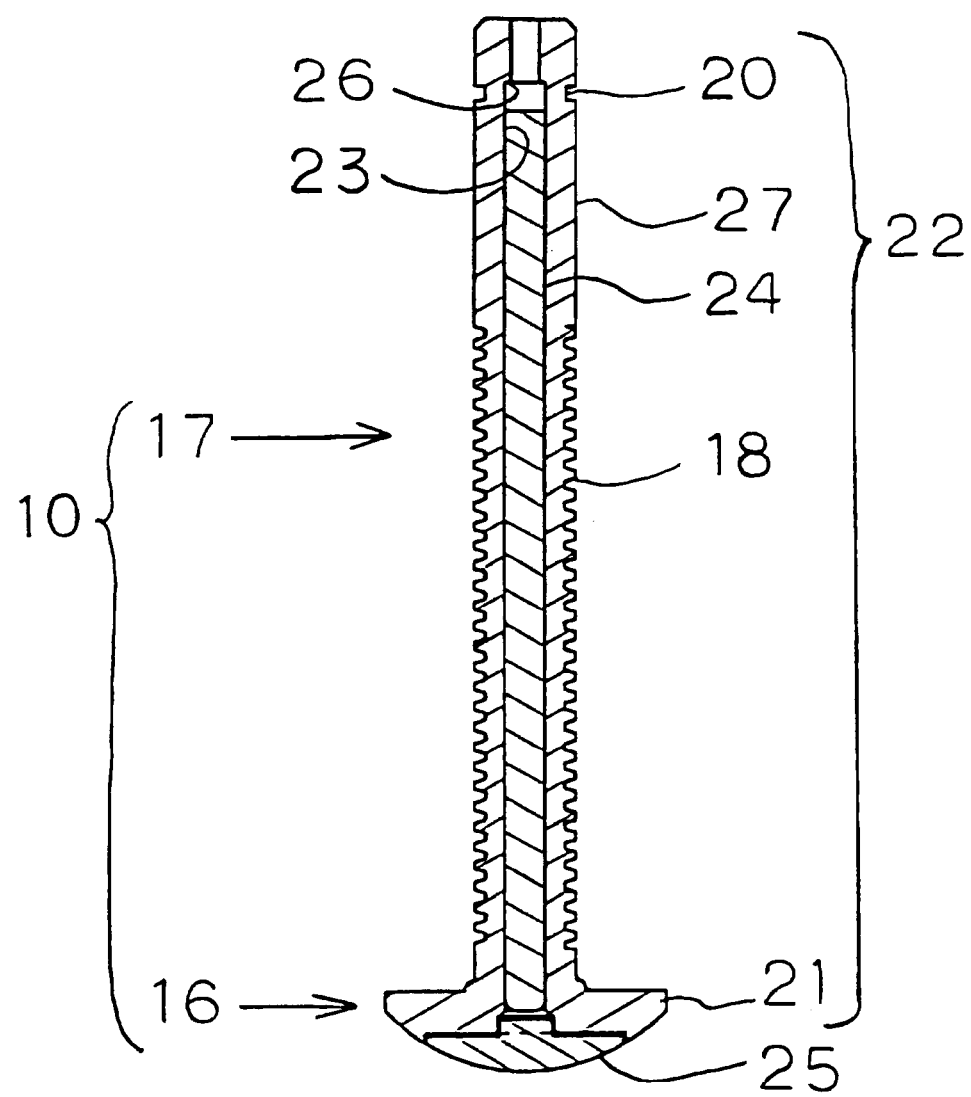
FIG. 3 is a sectional view of the leg of this invention.
Figure 4:
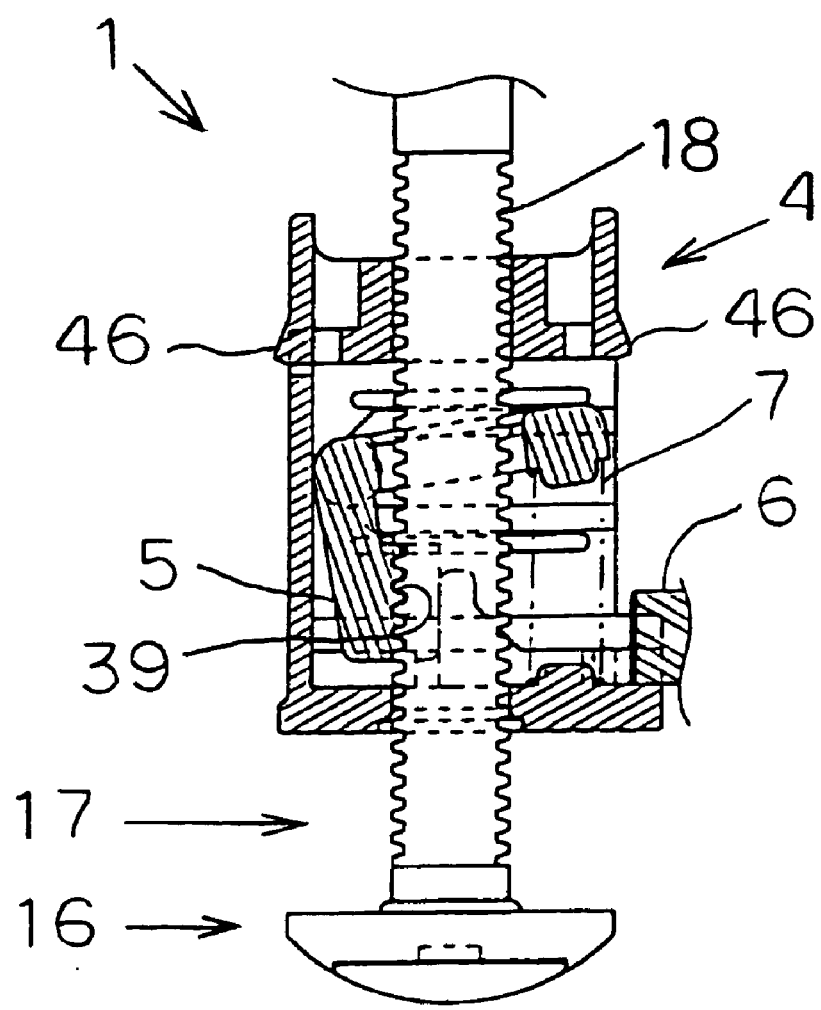
FIG. 4 is a sectional view of the equipment adjusting leg in the assembled state according to Example 1 of this invention when it is locked.
Figure 5:
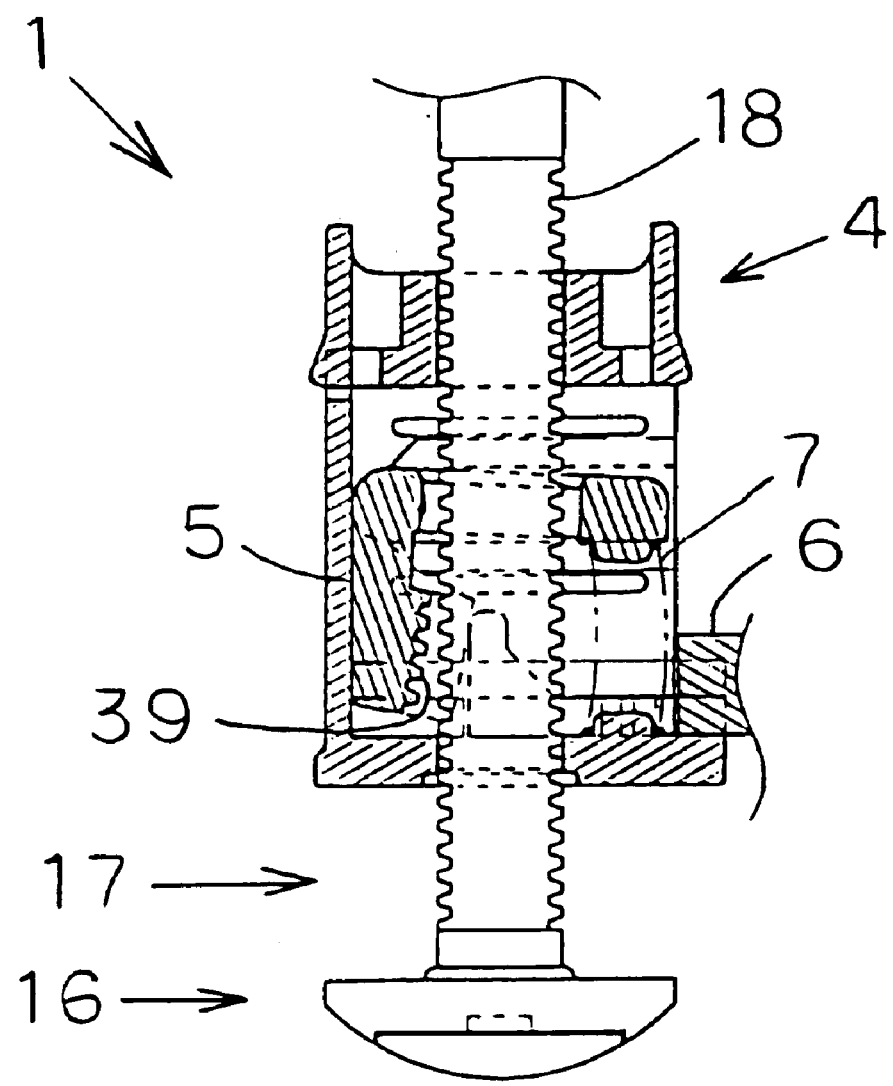
FIG. 5 is a sectional view of the equipment adjusting leg in the assembled state according to Example 1 of this invention when the lock is released.

FIG. 1 is an exploded perspective view of the equipment adjusting leg. FIG. 2 is a front view of the equipment adjusting leg in an assembled state. FIG. 3 is a sectional view of the leg. FIGS. 4 are 5 are sectional views of the equipment adjusting leg in the assembled state, and FIG. 4 illustrates the locked state and FIG. 5 illustrates the lock-released state.

An equipment adjusting leg 1 comprises: an attaching case 4 inserted into and mounted on an attaching hole 3 made in the bottom of equipment 2; a locking piece 5 pivoted on the attaching case 4 and placed in the attaching case 4 in a rotatable manner; a push button 6 provided within the attaching case 4 in such a manner that it projects out of the attaching case 4 from an opening 11 of the attaching case 4 and it is capable of sliding; a compression spring 7 fitting in a space between a spring seat 8 on the attaching case 4 and a spring seat 9 on the locking piece 5 so that it presses the locking piece 5 in such a direction as to engage with a concavo-convex part 18 of a leg 10 as described below; and the leg 10 which is inserted through shaft holes 12 and 13 in the attaching case 4, a shaft hole 14 in the locking piece 5, and a notch 15 in the push button 6, and which is supported in a manner freely movable up and down by the shaft holes 12, 13 and 14, and the notch 15 respectively; wherein the shaft holes 12, 13 and 14, and the notch 15 are located concentrically to each other.

Concerning the leg 10, a ground contact part 16 with a larger diameter is formed in its lower part and a sliding shaft 17 is formed in its upper part. Over the periphery of the sliding shaft 17 is provided a screw-like concavo-convex part 18, and at the top of the sliding shaft is formed a groove 20 for mounting an E-ring 19 as a stopper.

This leg 10 is composed of: a leg body 22 consisting of the sliding shaft 17 molded with a resin, and a top 21 of the ground contact part 16; and a pad 25 forming a bottom of the ground contact part 16. In the lengthwise direction of the sliding shaft 17, an elongated metallic member (a metal shaft in Example 1 as illustrated in the attached drawings) 24 is placed in a through hole 23 (a hole that extends from one end to the other end) which is previously made (see FIG. 3). The upper part of the through hole 23 is formed as a step 26 with a smaller diameter. The metal shaft 24 is inserted and pressed into the through hole 23 from underneath the leg body 22 toward the step 26, and the pad 25 is then attached with a pressure sensitive adhesive double coated tape or an adhesive agent to seal the through hole 23, thereby placing the metal shaft 24 as the core in the leg. The metal shaft 24 is indicated as the elongated metallic member in this example. However, without limitation to such metallic member, for example, an inexpensive ready-made metal screw may be used.

As the above-mentioned resin, it is desirable to use engineering plastics with excellent mechanical strength, such as polycarbonate, polyamide, polyacetal, PBT, and combinations of these respective materials and glass fibers.

Since the leg body 22 and the pad 25 are formed with the resin, it is possible to obtain, in a short period of time and at low cost, the molded products which are colored to match the color of the equipment by mixing dry colors without the necessity of painting.

By placing the inexpensive metal shaft 24 or the ready-made metal screw as the core in the inexpensive leg body 22, the leg 10 can be manufactured at low cost and without exerting a great amount of effort. Since the peripheral part of the sliding shaft 17 is constructed with the resin which has excellent mechanical strength, and the core is made of metal, it is possible to maintain the impact-resistant strength, to produce the leg 10 in large quantities as described above, and to achieve cost and weight reduction.

It is desirable that the concavo-convex part 18 of the sliding shaft 17 of the leg 10 be in a trapezoidal screw thread form. As for the shape of a normal screw thread, the thread is inclined to form an acute edge as in the case of a metric screw thread, and the smaller the diameter of the screw becomes, the sharper a lead angle becomes. Accordingly, when the leg is turned to make a fine adjustment, as the diameter of the screw becomes smaller, the engagement of the concavo-convex part of the screw with the locking member tends to be loosened easily. On the contrary, by making the concavo-convex part 18 of the leg in a trapezoidal shape, the engagement of the concavo-convex part 18 of the leg 10 with a concavo-convex part 39 of the locking piece to be described later will barely be loosened. Moreover, by forming an obtuse lead angle of the screw (concavo-convex part 18), the engagement of the concavo-convex part 18 with the concavo-convex part 39 is further tightened and will barely be loosened. The upper part of the sliding shaft 17 is a non-concavo-convex part 27 so that when the leg 10 is turned beyond the movable range, it is caused to slip in order to prevent any damage or breakage.

The attaching case 4 comprises a box part 28 in its lengthwise direction (a vertical direction), the periphery of which fits in the attaching hole 3 in the equipment 2. The attaching case 4 also has a box-shaped case body 29 under the box part 28, and the case body 29 is larger than the box part 28 and has an opening 11 on one of its sides. When the opening 11 side is considered the front side of the case body 29 and the side opposite the opening 11 is considered the rear side of the case body 29, a pair of shaft bearing holes 30 for bearing rotation shafts 31 of the locking piece 5 are formed in both side faces 33 and 34 at upper positions closer to the rear side. Moreover, first guide grooves 32 for guiding the push button 6 to be described later are made in the inside surfaces at the lower positions of the case body 29. Engaging holes 37 to engage with engaging projections 36 of elastic engaging pieces 35 provided on the push button 6 are made in both the side faces 33 and 34 of the case body 29 at lower positions closer to the front side.

At a position closer to the front side on the inside bottom of the attaching case 4, a spring seat 8 for attaching the compression spring 7 is provided in a manner projecting upward.

The locking piece 5 is shaped substantially in the letter "L." In the lower part of the letter "L" (the lower part of the locking piece 5) is provided an engaging part 38 with a concavo-convex part 39 having a plurality of steps in the midsection of a half cylinder. At the center corner of the letter "L" (on the rear side in the upper part) are provided a pair of rotation shafts on both side faces. In the upper part of the letter "L" (the upper part of the locking piece 5) is provided a top board 40 having a shaft hole 14. At the front edge of the top board 40, a spring seat 9 is provided in a manner projecting downward.

At the rear end of each rotation shaft 31 (the end side of the locking piece 5 to be inserted into the attaching case 4) is provided a slope 49. The attaching case 4 has second guide grooves 50 for guiding the respective rotation shafts 31 to the shaft bearing holes 30. The attaching case 4 also has a plurality of narrow slits 51 so that the case body 29 can easily be flexed. Accordingly, the locking piece 5 can easily be placed in the attaching case 4.

The push button 6 has a sliding part 42 which is located on the side opposite to a pressing part 41 and which has a notch 15 for inserting the sliding shaft 17 of the leg at its shaft center. The sliding part 42 has, on its both side faces in its lengthwise direction, guide projections 43 to fit in the first guide grooves 32 in the attaching case 4. This sliding part 42 also has a pair of elastic engaging pieces 35 with engaging projections 36 to engage with the aforementioned engaging holes 37 in the attaching case 4. (A pair of) rear ends 45 of the sliding part 42 (the end side of the push button 6 to be inserted into the attaching case 4) are formed to come in contact with the lower front ends 66 of the engaging parts 38 of the locking piece 5 and are designed to allow the locking piece 5 to turn by pressing the push button 6. The notch 15 has a second notch 48 in order to avoid contact with the compression spring 7.

An explanation is hereinafter given about how to use the equipment adjusting leg as indicated in Example 1 of this invention.

In order to attach the equipment adjusting leg 1 of this invention to a piece of equipment, the locking piece 5 is first pressed into and placed in the attaching case 4 by aligning the respective rotation shafts 31 to the positions of the respective second guide grooves 50 so that the rotation shafts 31 fit in the shaft bearing holes 30 in the attaching case 4. The compression spring 7 is then placed between the spring seat 9 on the locking piece 5 and the spring seat 8 on the attaching case 4. Subsequently, the press button 6 is placed in the attaching case 4 by causing the guide projections 43 of the sliding part 42 to slide along the respective first guide grooves 32 toward the rear side of the attaching case 4 and by causing the engaging projections 36 of the elastic engaging pieces 35 to engage with the engaging holes 37 in the case body 29.

Then, the sliding shaft 17 of the leg 10, which has the metal shaft 24 previously inserted therein as the core, is inserted in a manner freely movable up and down through the shaft holes 12 and 13 in the attaching case 4, the shaft hole 14 in the locking piece, and the notch 15 in the push button 6 respectively, and these shaft holes 12, 13 and 14, and the notch 15 are located concentrically to each other. The E-ring 9 as a stopper is then attached to the groove 20 in the top end of the leg 10. Subsequently, the box part 28 of the attaching case 4 is pushed into the attaching hole 3 in the equipment 2 from underneath to cause a snap fit 66 provided on the box part 28 to engage with a recess 47 of the attaching hole 3, so that the push button 6 and the leg 10 which has been fixed temporarily are fixed onto the equipment, thereby completing the attachment of the equipment adjusting leg 1. However, without limitation to the above-described snap fit method, any element for attaching the adjusting leg to the equipment may be selected as appropriate, such as fastening with a screw.

At this moment, as shown in FIG. 4, the locking piece 5 turns by means of the repulsion of the compression spring 7 in such a direction as to cause the concavo-convex part 39 of the engaging part 38 to engage with the concavo-convex part 18 of the sliding shaft 17, so that the concavo-convex parts 39 and 18 are brought into engagement and are thereby in a locked state. In this locked state, since the center of the rotation shaft (rotation supporting point) 31 of the locking piece 5 is displaced from the center of the sliding shaft 17, a force is imposed in such a direction as to cause the concavo-convex part 39 to engage with the concavo-convex part 18 of the leg 10. Accordingly, such an advantageous effect can be achieved that prevents the locking piece from turning when a vertical force is applied to the leg from underneath.

In order to adjust the height of the equipment adjusting leg 1, by pressing the pushing part 41 with a hand (or a finger), the rear ends 45 of the push button 6 push the lower front ends 66 of the locking piece, thereby causing the locking piece 5 to turn against the repulsion of the compression spring 7, releasing the engagement of the concavo-convex part 39 with the concavo-convex part 18, and releasing the lock as shown in FIG. 5.

After the height is adjusted, and when the hand (or finger) stops pushing the push button 6, the locking piece 5 turns by means of the repulsion of the compression spring 7 and the concavo-convex part 39 of the engaging part 38 and the concavo-convex part 18 of the leg 10 are brought back into engagement (the engagement is restored), thereby securing the lock again as shown in FIG. 4. If some fine adjustment is required, the leg 10 is turned to perform the adjustment.

In order to change the height of the adjusting leg 1, for example, when the location of the equipment is changed, actions similar to the above-described actions may be taken by pressing the push button 6 to release the lock, and adjusting the height again, and then the hand (or finger) stops pressing the push button 6 to cause the push button 6 to return to its original position, thereby locking the adjusting leg 1.

EXAMPLE 2

Figure 6:
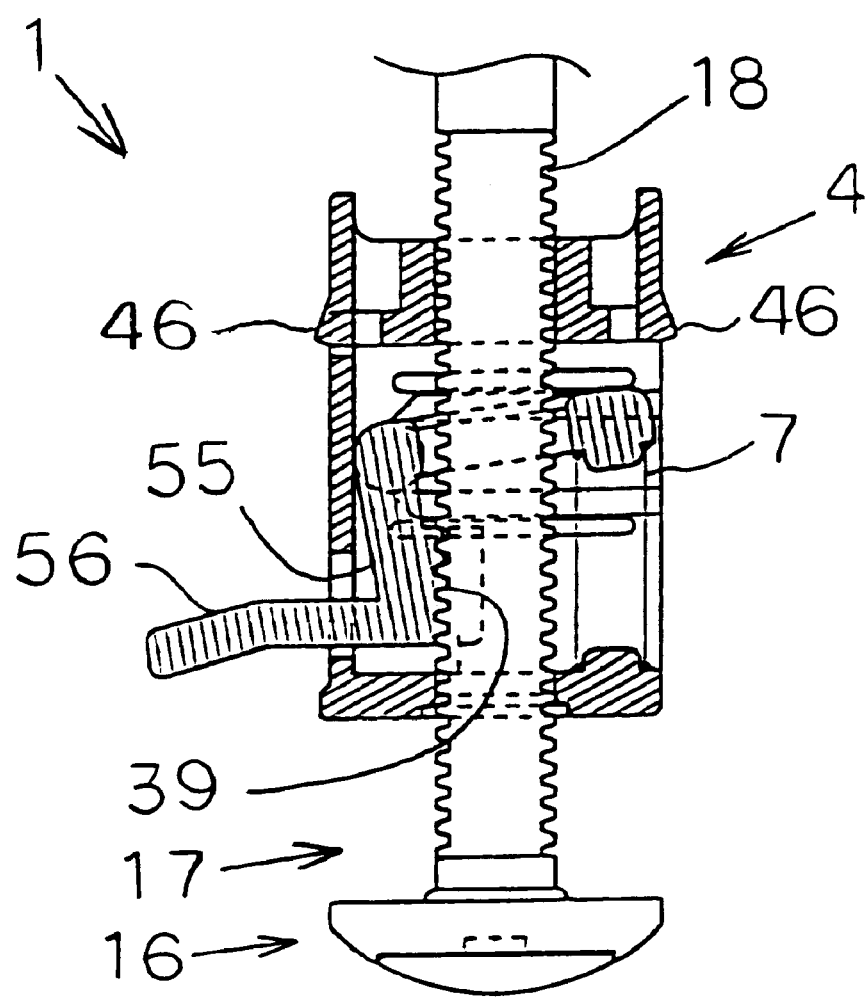
FIG. 6 is a sectional view of an equipment adjusting leg in the assembled state according to Example 2 of this invention when it is locked.
Figure 7:
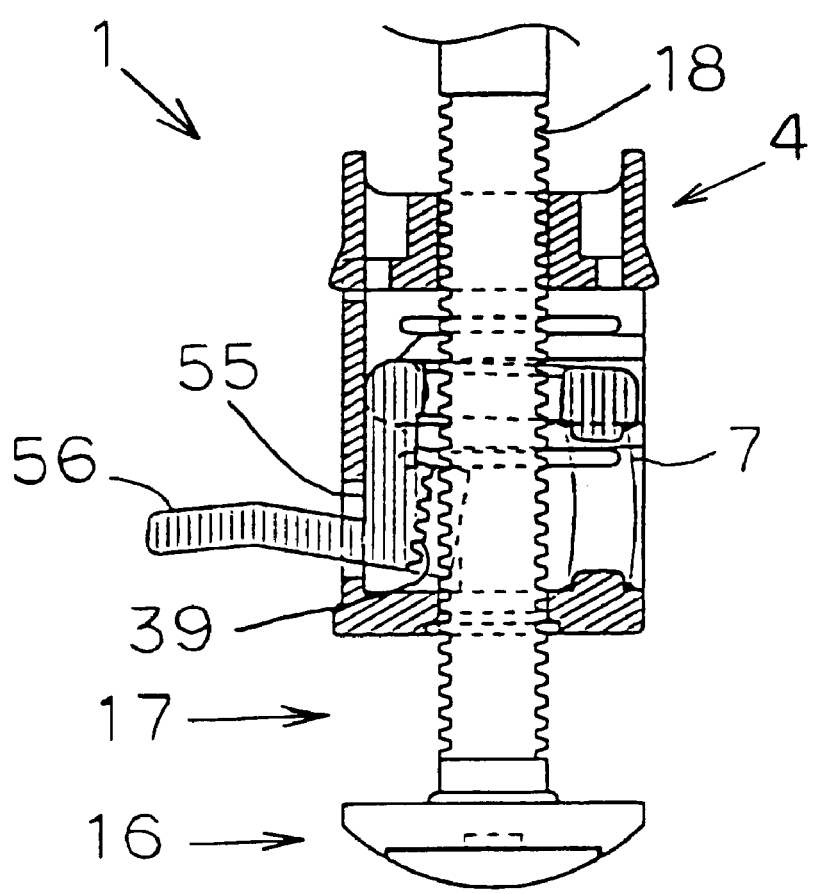
FIG. 7 is a sectional view of the equipment adjusting leg in the assembled state according to Example 2 of this invention when the lock is released.
Figure 8:
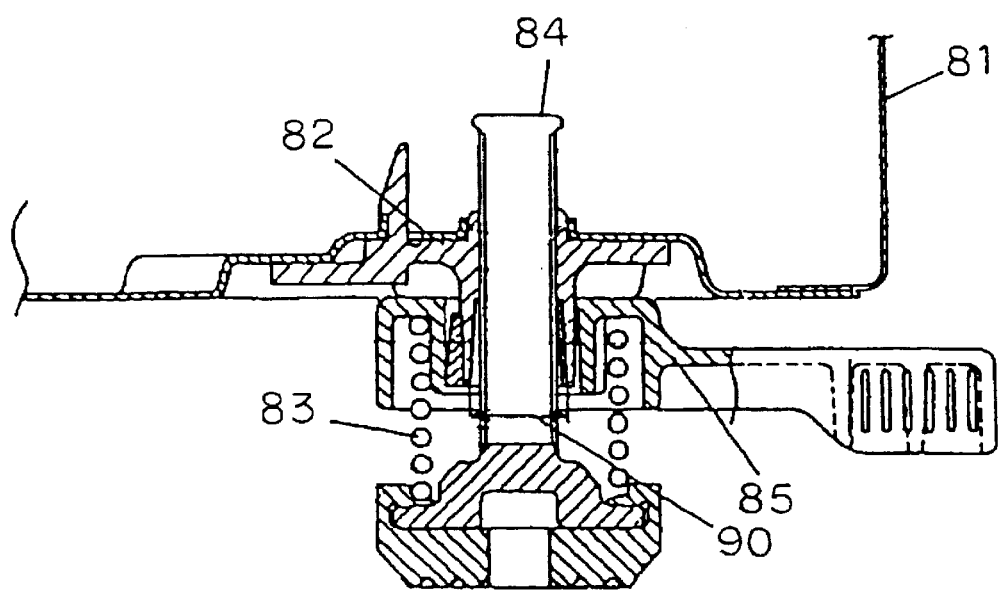
FIG. 8 is a sectional view of a sample conventional adjusting leg in use.
Figure 9:
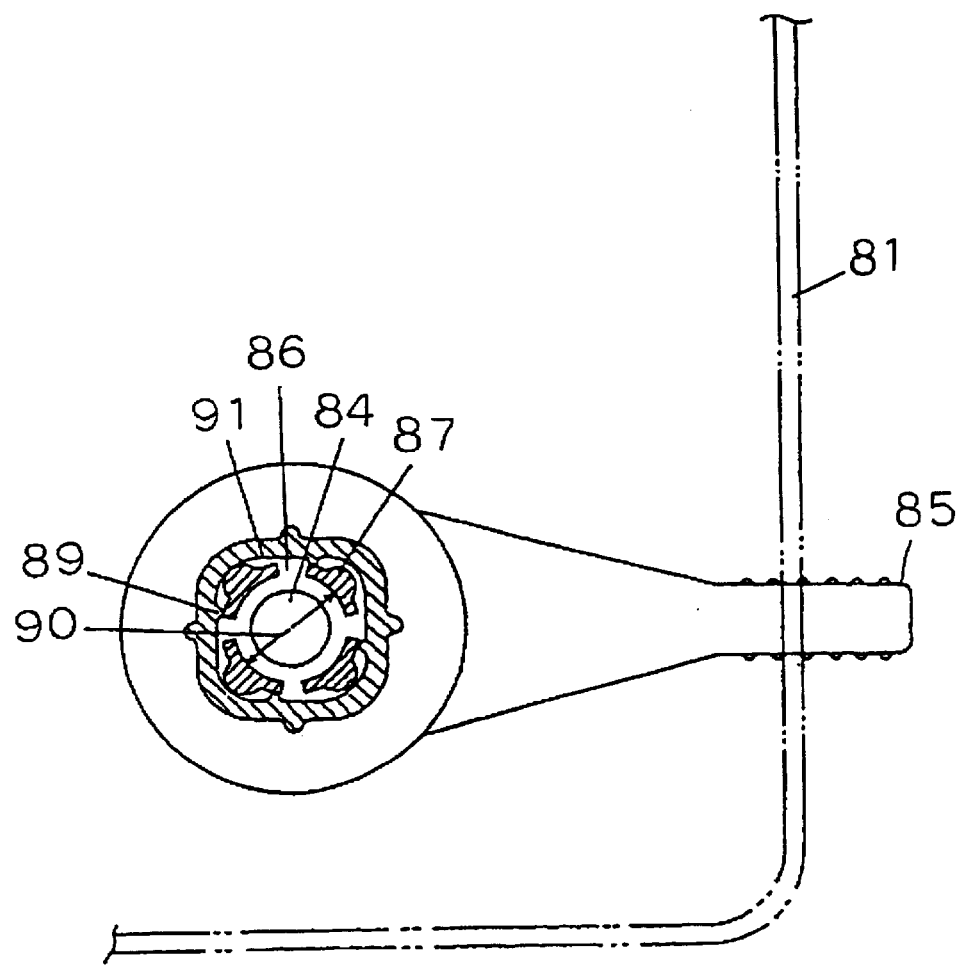
FIG. 9 is a sectional view of the sample conventional adjusting leg in use with its leg being released.
Figure 10:
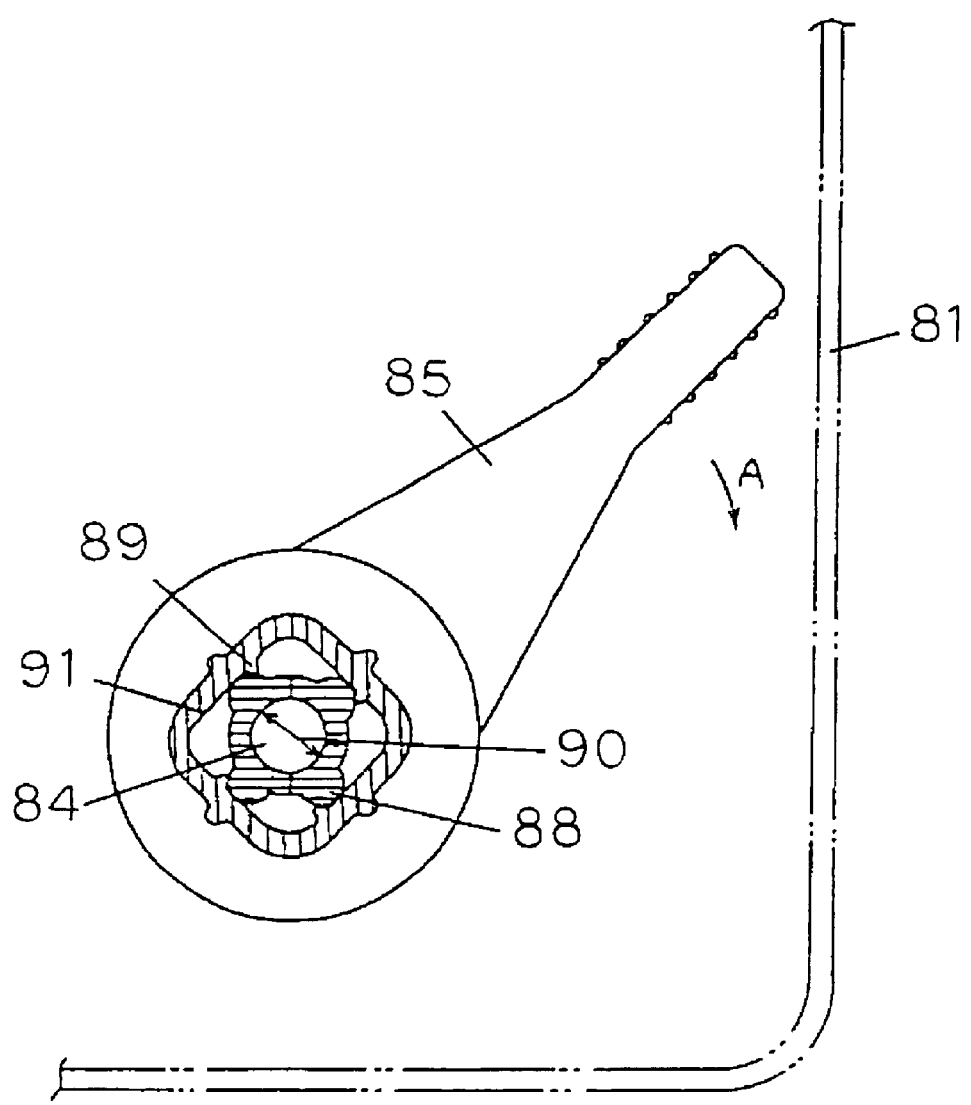
FIG. 10 is a sectional view of the sample conventional adjusting leg in use with its leg being fixed.

Example 1 describes a combination of the push button 6 and the locking piece 5 that turns by means of back-and-forth sliding movements of the push button 6, but a lever 56 may be used instead of the push button 6. Such example is shown in FIGS. 6 and 7. FIG. 6 is a front view of the adjusting leg in the locked state and FIG. 7 is a front view of the adjusting leg in the lock-released state.

The equipment adjusting leg of Example 2 is provided with, instead of the push button 6, a lever 56 that moves up and down as it turns. Moreover, the lever 56 is formed integrally with a locking piece 55 having a similar structure to that of the locking piece 5. The locking element and other parts of structure are similar to those in Example 1. In order to adjust the height of the equipment adjusting leg from the locked state as shown in FIG. 6, turning the lever 56 upward against the repulsion of the compression spring 7 causes the locking piece 55 to turn, thereby releasing the engagement of the concavo-convex part 18 of the leg sliding shaft 17 with the engaging part 39 of the locking piece 55, releasing the lock as shown in FIG. 7, and enabling the height adjustment.

In the above-described examples, when the metal shaft 24 is attached to the leg body 22, the through hole 23 with the step 26 is made in the leg body 22 and the metal shaft 24 is inserted into the through hole 23 from under the leg body 22, and the pad 25 is placed in such a way to cover the through hole 23 in order to prevent the metal shaft 24 from falling off. However, without limitation to such structure, any structure may be employed as long as the elongated metallic member such as the metal shaft 24 will not fall off. For example, the elongated metallic member such as the metal shaft 24 may be pressed and fixed in the through hole or be fixed with an adhesive, or the through hole may be provided with an undercut to prevent the elongated metallic member such as the metal shaft 24 from falling off. Moreover, insert molding may be performed to coat the elongated metallic member such as the metal shaft 24 with a resin. In this case of insert molding, the cost will increase to some degree because it requires a long molding time, but the secondary processing, painting, or other treatment to attach the stopper are no longer necessary and, therefore, it is possible to significantly reduce the cost as compared to the conventional insertion molded product with the head of the bolt coated with a resin. When covering with the pad 25 is unnecessary as described above, the top 21 of the ground contact part 16 can be molded integrally with the pad 25.

In the above-described examples, the E-ring 19 mounted on the top of the sliding shaft 17 is used as the stopper element for the sliding shaft 17. However, without limitation to such type of stopper element, a pin may be inserted, instead of the E-ring 19, into the top of the sliding shaft 17, or combinations of the E-ring 19, a screw, and/or a washer may be used, or a snap fit may be provided at the top of the sliding shaft 17.

As the present invention has the above-described structures, the following advantageous effects can be achieved.

Since the peripheral part is constructed by a resin having excellent mechanical strength and the core is composed of an elongated metallic member, it is possible to provide an equipment adjusting leg which maintains the impact-resistant strength, which can be produced in large quantities, and which can realize cost and weight reduction.

Moreover, by displacing the rotation supporting point of the locking piece from the center of the sliding shaft of the leg, a greater force is applied to the engaging part of the locking piece in such a direction as to cause engagement with the concavo-convex part of the leg. Therefore, such an advantageous effect can be achieved that it prevents the locking piece from turning when a vertical force is imposed on the leg from underneath.

What is claimed is:

1. An equipment adjusting leg comprising:
    a leg provided in a manner capable of moving back and forth relative to an external frame of a piece of equipment;
    a locking element for locking the back-and-forth movement of the leg; and
    a lock release element for releasing the locking element;
    wherein the leg has a sliding shaft for enabling the movement, and
    wherein the sliding shaft comprises a core made of a metallic shaft, and a peripheral part formed around the periphery of the core and made of resin having mechanical strength.

2. The equipment adjusting leg according to claim 1, wherein the leg is provided in the lower part of the external frame of the equipment in a manner capable of moving up and down, and a lower part of the leg is formed as a ground contact part and an upper part of the leg is formed as the sliding shaft.

3. The equipment adjusting leg according to claim 1, wherein the sliding shaft has a concavo-convex part.

4. The equipment adjusting leg according to claim 1, wherein the sliding shaft is composed of a screw.

5. The equipment adjusting leg according to claim 1, wherein the core takes an elongated shape.

6. The equipment adjusting leg according to claim 1, wherein the resin having mechanical strength is made of engineering plastic.

7. The equipment adjusting leg according to claim 6, wherein the engineering plastic is selected from a group consisting of polycarbonate, polyamide, polyacetal, PBT, and combinations of these respective materials and glass fibers.

8. The equipment adjusting leg according to claim 1, wherein the locking element comprises:
    an attaching case for inserting the sliding shaft therethrough;
    a locking piece pivoted on the attaching case in a rotatable manner and being capable of engaging with the sliding shaft; and
    an engagement maintaining element for maintaining the engagement of the locking piece with the sliding shaft;
    wherein a rotation shaft center of the locking piece is displaced from the shaft center of the sliding shaft.

9. The equipment adjusting leg according to claim 1, wherein the locking element comprises:
    an attaching case for inserting the sliding shaft therethrough;
    a locking piece pivoted on the attaching case in a rotatable manner and comprising a concavo-convex part to engage with a concavo-convex part of the sliding shaft; and
    an engagement maintaining element for maintaining the engagement of the concavo-convex part of the sliding shaft with the concavo-convex part of the locking piece;
    wherein a rotation shaft center of the locking piece is displaced from the shaft center of the sliding shaft.

* * * * *